United States Patent
Kroger et al.

[11] 3,975,688
[45] Aug. 17, 1976

[54] TELEVISION SHUT-OFF DEVICE

[75] Inventors: Richard A. Kroger; Larry E. Anderson, both of Minneapolis, Minn.

[73] Assignee: Richard A. Kroger, Fridley, Minn.

[22] Filed: Oct. 21, 1971

[21] Appl. No.: 191,418

[52] U.S. Cl. .............................. 325/392; 325/393
[51] Int. Cl.² ......................................... H04B 1/16
[58] Field of Search ............ 325/364, 390, 393, 395, 325/396; 307/252 R, 269; 178/DIG. 15

[56] References Cited
UNITED STATES PATENTS

| | | | |
|---|---|---|---|
| 3,378,775 | 4/1968 | Joseph | 325/393 |
| 3,541,453 | 11/1970 | Vanderpoel et al. | 325/395 |
| 3,559,072 | 1/1971 | Davisson | 325/395 |

*Primary Examiner*—Benedict V. Safourek
*Attorney, Agent, or Firm*—Schroeder Siegfried Ryan & Vidas

[57] ABSTRACT

An automatic shut-off device for television sets or equivalent apparatus receiving electromagnetic signals and transforming the same into audio or video signals. A shut-off device includes a detecting circuit which responds to the presence of a video or audio signal on the apparatus to be controlled permitting the set up of a switching circuit in the form of a silicon controlled rectifier energizing a relay in the power circuit of the apparatus or television set. The automatic device includes a time delayed portion simultaneously energized with the detecting portion to provide a timing function through unijunction transistor to control the firing of the silicon controlled rectifier in the operation of the relay.

5 Claims, 1 Drawing Figure

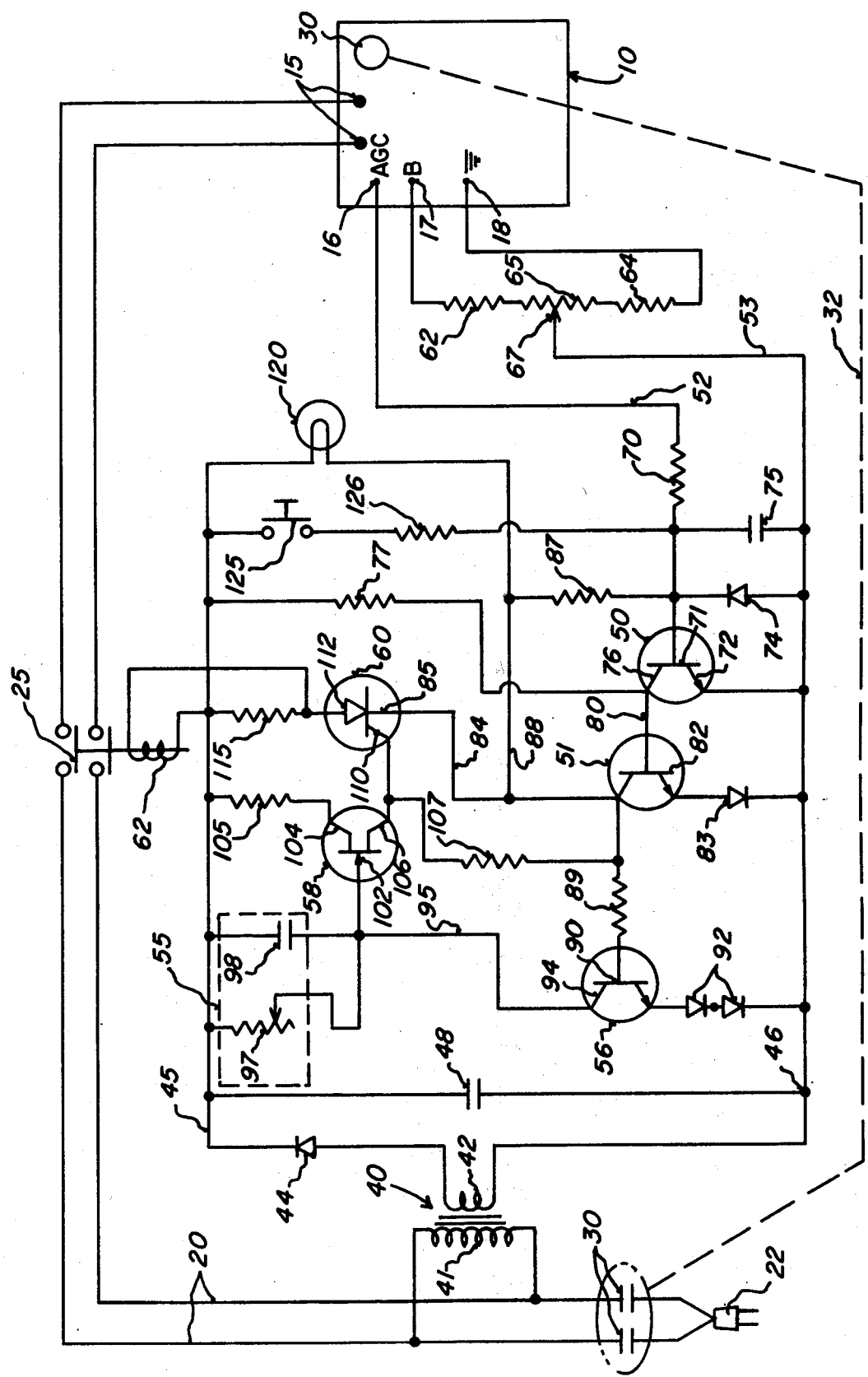

TELEVISION SHUT-OFF DEVICE

Our invention relates to a device for automatically shutting off apparatus such as television receivers and the like when the intelligence or video signal is no longer present due to station shutdown, set malfunction or improper tuning.

In the past there have been various types of shutdown devices or apparatus used in connection with television sets and radios for the purpose of effecting shutdown of the equipment under certain conditions, normally when the station or channel has signed off for the evening. These have generally been employed in connection with equipment which are normally left operating during the daytime hours and are remotely positioned such as to prevent manual operation of the equipment at sign-off time. Such equipment included clock mechanisms and specialized electronic circuits adapted for automatic remote control which respond to special broadcast signals indicating sign-off. In general these prior art devices and apparatus employ complicated electronic circuits which respond to specialized signals or audio tones and which incorporate thermal time delay equipment to facilitate interchange between stations or complex relay mechanisms which are generally not reliable for such purposes. In addition such apparatus when left operating continuously present a problem with continuous power consumption and deterioration of the shutdown equipment. In general the prior structures have required fairly extensive modifications of associated television sets to incorporate the shutdown devices thereto to enable such devices to control automatically, thereby increasing the cost of installation and generally making such devices inapplicable for universal application.

The present invention is directed to a simplified television shutdown apparatus or shutdown device to be used with a broadcast type apparatus which will respond to the intelligence or video portion of the signal from the apparatus to detect whether the receiver is properly tuned to a station and whether the receiver is receiving broadcast information or signals during normal operating hours. The absence of such an intelligence signal will operate the shut-off device after a predetermined time to shut down the television receiver or apparatus. The improved shut-off device may be readily incorporated with any type of television set by merely connecting the same to a power supply and AGC circuit of the same and to modify the energizing circuit to include a control relay for controlling power to the television set or apparatus. The improved shut-off device includes a simplified electronic timing mechanism which is adjustable for varying time periods and which may accurately respond to the presence or the absence of an intelligence signal to effect a timing function on the operation of the relay to a suitable electronic control which during the absence of the signal and after a predetermined time will fire and remain operative until the apparatus is reset. The improved shutdown device permits incorporation of the energizing circuit with the switching circuits of the apparatus or television set so that the shutdown device may be de-energized manually representing no load where desired but may be readily energized to permit energization of the television set or apparatus through a simplified switching arrangement in the shut-off device at the start of the broadcast day.

It is therefore the principal object of this invention to provide an improved shut-off device particularly adaptable for the use with television sets.

A further object of this invention is to provide an automatic shut-off device which may be readily incorporated into any type of television set and in which time delay in effecting shut-off after signal transmission is adjustable.

A still further object of this invention is to provide an improved automatic shut-off device which will be effective to shut-off the apparatus or television set whenever the same is improperly tuned or whenever the station goes off the air because of mechanical difficulty.

Another object of this invention is to provide an improved automatic television shut-off device which has improved reliability, low cost and is easy to install.

These and other objects of this invention will become apparent from the reading of the attached description together with the drawing showing a schematic circuit of the same.

Our improved automatic shut-off device for apparatus, such as television sets, is shown schematically in the drawing in connection with the television receiver which is indicated in block at 10. It is an example of apparatus which receives an electromagnetic signal and transforms the same into channel signals of a particular frequency and into a corresponding video and audio signal to be presented by the apparatus. Thus in the drawing, the television set is indicated as including a pair of alternating input terminals 15 to be powered from an alternating current power source to energize the set for the transformation of the electromagnetic signals. Also included in the drawing is an AGC terminal or point 16 which can be any place in the AGC circuit of the television set adapted to produce a voltage signal to indicate when the set is receiving electromagnetic signals and transforming the same into an intelligence or video signal to be presented by the set for the particular channel. Also included in the drawings is a bias point terminal 17 adapted to provide a reference voltage signal to the shut-off device and will be hereinafter identified. Associated with the B+ or bias point in the television set is a ground point, indicated at 18, which will complete the bias or reference circuit to provide a reference signal in the shut-off device corresponding with the carrier signal upon which the video signal is impressed in the apparatus.

The apparatus or television set 10 is connected to the alternating current source of power or energizing source by means of power conductors, indicated generally at 20, which are adapted to be connected to a suitable bayonet type plug 22 with the conductors being connected to the inlet terminals 15. Included in the power conductors are contacts 25 which are part of a relay mechanism, to be later identified, included in the shut-off device. The power conductors may also include a set of manually operated contacts, such as is indicated at 30, which may be independent manually operated contacts included as part of the shut-off device or as part of the television receiver as an extra set of contacts on the manually operated on/off switch or as the major contacts for the manually operated on/off switch of the television set, depending upon the installation. Thus in the drawing, the contacts 30 are shown with a dotted line 32 leading to a phantom indication of the contacts in the receiver where they may be incorporated in the television set.

The shut-off device therefore includes in the circuit drawings all of the structure outside of the television receiver or apparatus 10 including the inlet power leads 20 which would replace the normal power conductors to the apparatus in the installation of the same. The circuit for the shut-off device is powered from a transformer 40 having a primary winding 41 connected to the power conductors 20 with a step-down voltage secondary winding 42 connected through a diode 44 to a pair of low voltage DC power conductors 45, 46 respectfully. The diode in series with the secondary winding 40 provides a pulsed DC power circuit, the ripple of which is smoothed by a capacitor 48 connected across the conductors 45, 46. Thus, the conductors 45, 46 will provide the energizing circuit for the low voltage electronic components of the device as will be hereinafter identified.

The shut-off device includes a detecting portion formed by a pair of transistors 50, 51 which are directly coupled to one another and are fed from an input circuit as evidenced by conductors 52, 53. The detecting portion of the circuit also energizes a time delay portion formed by an RC network, indicated generally at 55, whose discharge is controlled by a transistor 56 with the discharge of the RC network controlling the firing of a unijunction transistor 58 to provide a pulsed signal output from the time delay portion of the circuit. The shut-off device further includes a switching portion having a silicon controlled rectifier 60 operating through transistor 51 and controlling the energization of a relay coil 62 whose contacts 25 are included in the power energization circuit for the television device. Thus as will be seen in the drawing, the input to the shut-off device includes the conductor 52 connected to the AGC point 16 of the television device with a conductor 53 being connected to a bias level adjusting network formed by resistors 62, 64 connected in series circuit with an adjustable resistor 65 all of which are connected across the B+ or bias level terminal or point 17 in the television set and the ground connection 18 included therein. The AGC point in the television device is selected to have basically a DC signal thereon which is at one level when the circuit is locked in on a video and audio signal but which will increase or change whenever the antenna signal is lost and the circuit attempts to tune in on a new antenna signal. The adjustable resistor 65 includes a wiper 67 which is connected to the input conductor 53 to provide an input level signal to the shut-off device representative of the carrier portion of the video or audio signal taken from the television set. The voltage dividing network adjusts the bias level of the wiper 67 to correspond with the AGC signal for the carrier signal with the video signal thereon in a particular television set so that the conductors 52, 53 have impressed thereon a differential voltage signal corresponding to the presence or absence of the video signal for the corresponding channel to which the particular set is tuned. The input conductors 52, 53 are connected respectfully to the base and emitter electrodes on the transistor 50 with a current limiting and impedance matching resistor 70 being included in the circuit between the AGC point and the base of the transistor 50. Also connected between the base and emitter electrodes identified at 71, 72 respectfully is a diode 74 designed to limit the input current to the transistor 50 and a smoothing or filtering capacitor 75. The collector electrode 76 of transistor 50 connected through a load resistor 77 to the supply conductor 45. Transistor 51 is directly coupled to the transistor 50 by means of a conductor 80 connected to the collector 76 of transistor 50 and the base 82 of the transistor 51. The emitter electrode of the transistor 51 is connected through a diode 83 to the supply conductor 46 and the collector of transistor 51 is connected through a conductor 84 to the cathode electrode 85 of the silicon controlled rectifier 60 such that when the transistor 51 is fired it provides the energizing circuit for the SCR, as will be hereinafter identified. In the operation of the amplifier formed by the transistors 50, 51, transistor 50 is normally "on" with the presence of an intelligence or video signal or a voltage difference signal in one direction and magnitude between the conductors 52, 53. When the video signal is lost, the AGC signal increases in magnitude and the net differential signal on the conductors 52, 53 is of a different direction and magnitude to turn the transistor 50 off with the absence of video signal. Similarly the amplifier portion or transistor 51 is normally "off" when transistor 50 is on and is energized to an on condition whenever transistor 50 turns off. Thus the voltage bias obtained from the load resistor 77 when transistor 50 is off will be sufficient to fire or energize the transistor 51. The voltage differential between the conductors 52, 53 is also applied through a bias resistor 87 and conductors 88 to the bias resistor 89 and the base 90 of the transistor 56 in the time delay circuit. Its emitter is connected by diodes 92 to the energizing conductor 46 while its collector 94 is connected by means of the conductor 95 to the RC network formed by adjustable resistor 97 and capacitor 98 connected in parallel with one another and to the energizing conductor 45 of the DC control circuit. The opposite common point between the resistor and capacitor combination in addition to being connected to conductor 95 is also connected to a control or emitter electrode 102 of the unijunction transistor 58 which has one base electrode 104 connected through a load resistor 105 to the supply conductor 45 with the other base electrode 106 connected through a load resistor or bias resistor 107 to the conductor 88. The base electrode 106 is also connected to the gate electrode 110 of the silicon controlled rectifier whose anode electrode 112 is connected through the relay coil 62 to the supply conductor 45 with a resistor 115 connected in parallel with a relay coil. In normal operation of the circuit for the shut-off device, whenever there is a differential signal evidencing changes in signal level on the AGC circuit applied to the input conductors 52, 53, this signal is applied to the base of the transistor 56 which is set to an on condition causing current flow through the RC network and maintaining a high voltage level or signal applied to the emitter electrode 102 of the unijunction transistor. Whenever the AGC signal changes indicating that the video or antenna signal is lost, the transistor 56 will turn off causing the capacitor 98 of the RC network to discharge through the resistor 97. The decay of the same as controlled by the adjustable resistor 97 will set the time delay for the delay portion of the circuit and when the voltage drops to a predetermined level, the unijunction transistor 58 will fire in a conventional manner applying a pulsed control signal to the gate electrode 110. The circuit through the base electrode of the unijunction transistor will be completed through the transistor 51 which will be turned on under such conditions permitting the SCR to fire whenever the gate electrode receives the pulse of voltage due to firing of the unijunction transistor. The normal time delay can be adjusted for varying television sets through adjustment (not shown) of the capacitor or the resistor for a factory setting normally in the vicinity of 55 seconds. Once the silicon controlled rectifier 60 is fired, it will energize the relay coil 62 causing the contact 25 thereof to open de-energizing the television set by opening the power circuit to the same. Once the silicon rectifier has fired after receiving the pulse of voltage at gate electrode 110, it will remain fired as long as the transistor 51 is in an energized condition providing a completed circuit between the power electrodes 45, 46 thereby holding the contacts 25 open and preventing re-energization of the television set or apparatus with which it is associated. At the start of the timing cycle or whenever the voltage differential is increased in a predetermined direction between the input conductors 52, 53 indicating a lack of video signal and the hunting for a new video signal on the television AGC circuit, transistor 50 will become de-energized and transistor 51 of the detecting amplifier portion will energize. This will set up a circuit for an indicating light 120 connected across the supply conductor 45 and to the collector electrode of the transistor 51 which timing light will remain energized and as long as the transistor 51 remains fired to give a visual indication that the timing cycle has been initiated or that the set has been deenergized and the shut-off device is operating. Also connected to the supply conductor 45 is a momentary contact manually operated switch 125 which is directly connected at one contact point to the conductor 45 and through a resistor 126 to the base electrode 71 of the transistor 50. The shut-off device will normally be operative and de-energized whenever the television set is operating and electromagnetic signals are present at the antenna portion of the same to provide a predetermined AGC level signal corresponding to that of the bias level as determined by the voltage dividing network and the adjustable resistor 65. Whenever a broadcast is terminated at the end of a broadcast day, the AGC voltage will change corresponding to the carrier level without video signal which will increase the differential between the input conductors 52, 53 in a particular direction and cause the transistor 50 to go to a de-energized condition. At the resumption of a broadcast day whenever the particular channel is again on the air, the operation of the television set can be reinitiated by depressing the momentary contact switch 155 and holding it down applying a voltage bias from the conductor 45 to the base 71 of the transistor 50 causing the same to turn on as it would under the presence of an video signal therein and until such time that a corresponding AGC signal appears at the television set with re-energization of the same. Thus with the voltage applied to the base of the transistor 50 through the momentary contacts 125, transistor 50 will become energized de-energizing the transistor 51 and de-energizing the SCR or switching device for the shut-off circuit causing the relay coil 62 to be de-energized and the contacts thereof to resume a normally closed position reinitiating the energizing or power circuit for the television apparatus. The same operation causing de-energization of the television set will be present whenever the AGC portion of the circuit loses video signal due to some malfunction at the broadcasting station. The same operation will occur as if a broadcast has been terminated for a broadcast day and the set would have to be reinitiated by energization or by depressing of the momentary contact 125 to re-energize the shut-off device to cause the relay 65 to go to the normally closed position of its contact supplying power to the television apparatus. The time delay portion of the shut-off device provides sufficient time delay for switching between channels under normal operation of the device so that the television set will not shut-off during switching or changing of stations.

Whenever it is desired to de-energize the shut-off device, the manually operated contacts 30 which may be included in the master on/off switch for the television device or as a separate switch may be operated to the open position to deenergize the shut-off device when its operation is not needed.

Thus in the operation of the shut-off device, the apparatus to be controlled, such as the television set, will be automatically shut off whenever the broadcasting station shuts down after its program day. The shut-off device will not allow the apparatus to be turned again until the signal is present at the receiver. The voltage taken from the AGC portion of the television device as shown in the embodiment described herein, will be referenced to voltage level which will provide a voltage differential at the input of the apparatus indicative of the presence of a video signal thereon and to detect the absence of the video signal whether it is not present in the television device. It will be applied to the differential amplifier formed by the transistor 50, 51 to turn off the transistor 50 which is normally operated under the presence of the video signal and to turn on the transistor 51 which is normally de-energized under the presence of a video signal. The transistor 51 will condition the switching circuit of the SCR allowing the same to be fired after a predetermined time delay determined by the RC network and the transistor 56 which provides the initial circuit to cause the capacitor of the RC network to discharge through the resistor and provides a voltage level signal to the unijunction transistor causing the same to fire and control the gate electrode of the SCR. With the SCR fired, the relay 62 will be energized causing its normally closed contacts to open and opening the AC power circuit to the apparatus or the television set.

In considering this invention it should be remembered that the present disclosure is illustrative only and the scope of the invention should be determined by the appended claims.

What is claimed is:

1. A television shut-off device comprising; a television set for receiving and transforming a plurality of electromagnetic signals to corresponding television channel video and audio signals and having an AGC circuit and a bias supply therein, an AC power supply for supplying power to the television set for reception and transformation of said channel signals, circuit means connecting the power supply to the television set and including switch means for opening and closing the circuit means to control energization of the television set from the power supply, detector circuit means connected to the AGC circuit of the television set and bias supply in the television set and including electromagnet means connected to and operating the switch means in the circuit means for the opening and closing of the circuit means from the power supply to the television set, said detector circuit means including means for selectively detecting the presence of a signal indicative of the presence and absence of a video signal in the television set through comparison of a voltage in the AGC circuit and the bias supply, said signal detecting means including a two stage amplifying switching device responsive to the differential between the reference level signal and the AGC signal and in which one stage is energized with the presence of the video signal and the other stage is energized with the absence of a video signal in the television set, timer means included in the detector circuit means connected to and responsive to the means selectively detecting the presence of a signal indicative of the absence of a video signal and providing a pulsed output signal therefrom at the end of a predetermined period of time, said timer means including an RC network, a unijunction transistor, and an additional transistor, the RC network upon discharge controlling the firing of the unijunction transistor to provide the pulsed output signal to the switch means, said additional transistor being connected to said amplifying means and responsive to the signal indicative of the absence of video signal in the television set to become operative to control the discharge of the capacitive component of the RC network connected to the unijunction transistor to control firing the same, switching means having two conditions of operation connected to the timing means to be operated to one condition of operation with the pulsed output signal from the timing means, and means connecting the switching means to the electromagnetic means in the detector circuit for opening the circuit means connecting to the television set from the power supply under the presence of said one condition of operation of the switching means.

2. The television shut-off device of claim 1 in which the switching means includes a silicon controlled rectifier having a gate electrode connected to the unijunction transistor to control firing of the same with the silicon controlled rectifier controlling energization of the electromagnet with the switching means in the circuit means connecting the power supply to the television set for opening the circuit means to the television set.

3. The television shut-off device of claim 2 and including additional switching means connected to an energizing circuit for the detector means and adapted to provide a bias level to the two stage amplifying switching device to operate the same independent of the signal in the AGC circuit indicative of a video signal.

4. The television shut-off device of claim 3 in which the detector circuit means includes an energizing means having a transformer connected to the alternating current power supply and diode for providing a DC power supply to the detector means.

5. The television shut-off device of claim 4 and including additional switching means in the alternating current power supply circuit to control de-energization of the television set and the detector circuit independent of the absence of a signal in the AGC circuit of the televison set.

* * * * *